Patented Feb. 14, 1950

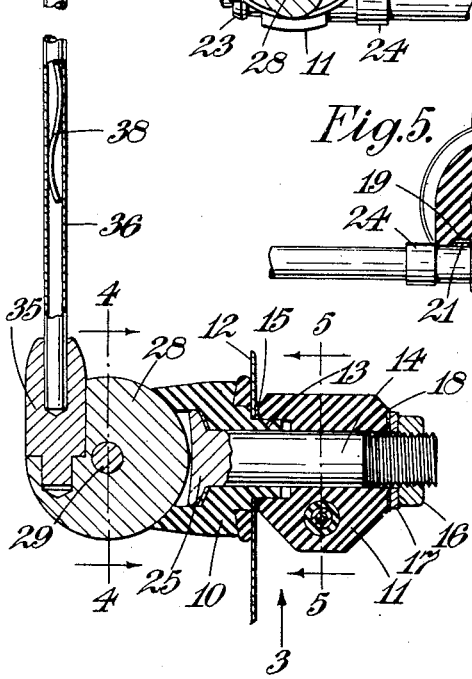

2,497,687

UNITED STATES PATENT OFFICE 2,497,687

RADIO AERIAL FOR USE ON VEHICLES

Walter Jonathan Pickett, Charles Molyneux Carington, and George William Shoobert, London, England, assignors to K. L. G. Sparking Plugs Limited, London, England, a British company Application October 13, 1947, Serial No. 779,546
In Great Britain August 30, 1946

3 Claims. (Cl. 250—33)

This invention relates to radio aerials for use on vehicles and has for its object to provide a simple and inexpensive construction whereby an aerial can be readily adjusted to an "erect" or "receiving" position, or swung down into a stored position.

According to this invention, a radio aerial assemblage for a vehicle comprises a base which constitutes the attachment to the vehicle, and an aerial pivotally mounted on the base with a frictional control so as to be readily adjustable alternatively to its erect position or its stored position.

Preferably the assemblage comprises a bolt whereby the base is secured to a panel of the vehicle, a forked end of the bolt, and a disc-like block carrying the aerial and pivotally mounted between the limbs of the fork with a friction-washer or washers to restrain its movement.

According to another feature of the invention, an adjustable aerial is of telescopic construction comprising a tube and a rod of smaller diameter than the bore of the tube slidable in it, the inner end portion of the rod being distorted to engage frictionally with the bore of the tube to retain the rod in any position to which it is adjusted longitudinally in the tube. The outer end of the tube from which the rod is extended may, according to this feature of the invention, be reduced in its internal diameter so that the rod is a sliding fit therein.

In the accompanying drawings which illustrate one construction in accordance with this invention, Figure 1 is a side elevation in central section of the complete device, Figure 2 is a side view of Figure 1, Figure 3 is an inverted plan view, looking in the direction of the arrow 3 of Figure 1, Figure 4 is a sectional view on the line 4—4 of Figure 1, and Figure 5 is a sectional view on the line 5—5 of Figure 1.

The base of the aerial assemblage is constituted by two blocks of insulation material 10, 11 respectively, which are assembled one on each side of a metal panel 12 of the vehicle; this may be a roof panel or a wall panel as is most convenient. The block 10 is formed with a cylindrical extension 13 which projects through a suitable opening formed in the panel 12 and engages in a co-operating socket formed in the block 11 and the two blocks are secured by a bolt 14 extending centrally through them. The projection 13 above-mentioned ensures that the bolt 14 is insulated from the panel 12. For the purpose hereinafter defined a metal washer 15 is interposed between the block 11 and the panel 12, the surface of the latter being cleaned to enable the washer 15 to make good electrical contact with it. The bolt is secured by a nut 16 and a washer 17 threaded on it, and another metal washer 18 similar to the washer 15 is gripped between the end of the block 11 and the washer 17 so that an electrical circuit can be provided from the bolt 14 through the nut 16 and washer 17 to the washer 18.

The block 11 is formed with two slots 19, 20 (see Figures 3 and 5), and a spring-finger 21 formed integrally with the washer 15 extends along the slot 19 adjacent a transverse bore in the block. Similarly in the slot 21 the spring-finger 22 extends from the washer 18 adjacent the same transverse bore. This bore receives the end of a lead-in wire constituted by a cable having a metallic sheath or brading to screen it. The core of the cable has secured on it a nipple 23 which is engaged by the spring-finger 22, and the sheath of the cable has a sleeve 24 soldered or otherwise secured to it to give a good electrical contact and this sleeve is engaged by the spring-finger 21. When the end of the cable is inserted in the transverse bore in the block 11 it thereby establishes connection from the core to the washer 18 and thence to the shaft 14, and also makes connection from the screening sheath to the washer 15 and thereby to the body of the vehicle which constitutes the earth connection.

The bolt 14 has a nut 16 as mentioned above screwed on one end, and the other end 25 which lies within a recess in the block 10 is forked to provide two limbs 26, 27 which receive between them a member of disc-like or cheese-form 28. A bolt 29 is threaded through the fork-members 26, 27 to serve as a pivot on which the member 28 can turn, and in order to provide a frictional control for its turning movement the member 28 has inset into it a friction material 30 which engages the inner face of the fork-member 27. The bolt 29 is provided with a head 31 under which there is a washer 32 and a spring 33 located in a recess in the member 28, and the other end of the bolt is screw-threaded to receive a cap-nut 34 which is screwed on it to engage the fork 27. Tightening of the nut 34 against the action of the spring 33 presses the friction surface 30 into contact with the fork-member 27 and this pressure is adjusted to give the desired frictional effect.

The member 28 has mounted in it a socket-member 35 which carries a metal tube 36 constituting a part of the aerial rod, and within this tube there is slidable a rod 37 which is curved at its inner end 38 to provide frictional engagement with the inside of the tube 36. The upper end 39 of the tube may be turned down to a smaller diameter so that the rod 37 is a sliding fit in the tube. The rod is provided with a head 40 at its outer end to enable it to be withdrawn and to limit its entry into the tube. When it is to be erected to its receiving position, the rod 37 is withdrawn from the tube to give the desired height to the aerial.

The assemblage above described is mounted in any convenient position, say for example at the front of a roof panel of the vehicle so that the aerial can be swung downwards to lie along the roof in a stored position or swung up to a vertical position. Since the control of its movement is a frictional one, it is merely adjusted by hand to the desired position. The frictional control ensures that if the aerial when erected fouls in pitch, such for example as a garage roof, it is merely pressed down to its stored position and suffers no damage.

We claim:

1. In a radio aerial assemblage for a vehicle the combination of a two-part base whereof the first part is formed with a spigot engaging with the second part, a bolt extending through both said parts, a forked head on said bolt having two limbs extending out from said first part, a block mounted between said limbs, a friction washer between said block and one of said limbs, a spring on the other side of said block, means for compressing said spring to provide frictional resistance against rotation of said block between the limbs of said fork, and a telescopic aerial rod secured on said block and rotatable therewith between an erect receiving position and a stored position.

2. In a radio aerial assemblage for a vehicle the combination of a two-part base whereof the first part is formed with an extension engaging with the second part, a first bolt extending through both said parts, a forked head on said first bolt having two limbs extending out from said first part, a block mounted between said limbs, a friction washer between said block and one of said limbs, a second bolt extending through said limbs and said block, a head on said second bolt extending through an opening in the other of said limbs, a spring between said head and said block, a nut on the other end of said second bolt abutting the first said limb, and a telescopic aerial rod secured on said block and rotatable therewith between an erect receiving position and a stored position.

3. A radio aerial assemblage for a vehicle according to claim 1, wherein the said second part of said base is formed with two longitudinally extending slots and a transverse bore, in combination with a screened cable having electrical contact-pieces in said bore, whereof one connected to the screening cover is exposed to one of said slots and the other connected to the cable core is exposed to the other of said slots, a metal washer between said two parts of the base having a finger extending along one of said slots and engaging electrically the screening cover of said cable, a second washer on the other end of said second part of the base having electrical connection with said bolt, and a finger on said second washer extending along the second of said slots and having electrical connection with the core of said cable.

WALTER JONATHAN PICKETT.
CHARLES MOLYNEUX CARINGTON.
GEORGE WILLIAM SHOOBERT.

REFERENCES CITED

The following references are of record in the file of this patent:

UNITED STATES PATENTS

| Number | Name | Date |
|---|---|---|
| 2,251,889 | Ludway | Aug. 5, 1941 |
| 2,284,782 | Watson | June 2, 1942 |
| 2,321,272 | Becwar | June 8, 1943 |
| 2,360,248 | Mace | Oct. 10, 1944 |